United States Patent
Wang et al.

(10) Patent No.: US 12,387,486 B2
(45) Date of Patent: Aug. 12, 2025

(54) DATA DIMENSION REDUCTION METHOD BASED ON MAXIMIZING RATIO SUM FOR LINEAR DISCRIMINANT ANALYSIS

(71) Applicant: NORTHWESTERN POLYTECHNICAL UNIVERSITY, Xi'an (CN)

(72) Inventors: Jingyu Wang, Xi'an (CN); Hongmei Wang, Xi'an (CN); Feiping Nie, Xi'an (CN); Xuelong Li, Xi'an (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 143 days.

(21) Appl. No.: 17/997,684

(22) PCT Filed: Apr. 29, 2021

(86) PCT No.: PCT/CN2021/090835
§ 371 (c)(1),
(2) Date: Nov. 1, 2022

(87) PCT Pub. No.: WO2022/178978
PCT Pub. Date: Sep. 1, 2022

(65) Prior Publication Data
US 2024/0029431 A1    Jan. 25, 2024

(30) Foreign Application Priority Data
Feb. 26, 2021    (CN) .......................... 202110216054.1

(51) Int. Cl.
G06V 20/10    (2022.01)
G06V 10/34    (2022.01)
(Continued)

(52) U.S. Cl.
CPC ............ *G06V 20/194* (2022.01); *G06V 10/34* (2022.01); *G06V 10/764* (2022.01); *G06V 10/774* (2022.01)

(58) Field of Classification Search
CPC ............. G06V 10/7715; G06V 10/771; G06V 20/194; G06V 10/77
See application file for complete search history.

(56) References Cited

PUBLICATIONS

Bandos, Tatyana V., Lorenzo Bruzzone, and Gustavo Camps-Valls. "Classification of hyperspectral images with regularized linear discriminant analysis." IEEE Transactions on Geoscience and Remote Sensing 47.3 (2009): 862-873. (Year: 2009).*

(Continued)

*Primary Examiner* — Raphael Schwartz
(74) *Attorney, Agent, or Firm* — Flener IP & Business Law; Zareefa B. Flener

(57) ABSTRACT

This invention relates to a data dimension reduction method based on maximizing a ratio sum for linear discriminant analysis, which belongs to the fields of image classification and pattern recognition. It includes constructing a data matrix, a label vector and a label matrix; calculating a within-class covariance matrix and a between-class covariance matrix; constructing the optimization problem based on maximizing the ratio sum for the linear discriminant analysis; using the alternating direction method of multipliers to obtain the projection matrix which can maximize an objective function. This invention establishes the objective function based on maximizing the ratio sum for the linear discriminant analysis to avoid the problem that the traditional linear discriminant analysis tends to select features with small variances and weak discriminating ability. It can select features which are more conducive to classification. Moreover, this method does not depend on the calculation of the inverse matrix of the within-class covariance matrix and (Continued)

does not require data preprocessing, which improves the adaptability of the data dimensionality reduction method to the original data feature.

2 Claims, 2 Drawing Sheets

(51) Int. Cl.
*G06V 10/764* (2022.01)
*G06V 10/774* (2022.01)

(56) References Cited

PUBLICATIONS

Du, Qian. "Modified Fisher's linear discriminant analysis for hyperspectral imagery." IEEE geoscience and remote sensing letters 4.4 (2007): 503-507. (Year: 2007).*

Xanthopoulos, P., Pardalos, P.M., Trafalis, T.B. (2013). Linear Discriminant Analysis. In: Robust Data Mining. SpringerBriefs in Optimization. Springer, New York, NY. https://doi.org/10.1007/978-1-4419-9878-1_4 (Year: 2013).*

* cited by examiner

DATA DIMENSION REDUCTION METHOD BASED ON MAXIMIZING RATIO SUM FOR LINEAR DISCRIMINANT ANALYSIS

TECHNICAL FIELD

The present invention belongs to the fields of image classification and pattern recognition, and specifically relates to a data dimension reduction method based on maximizing the ratio sum for linear discriminant analysis.

BACKGROUND OF THE INVENTION

Data dimension reduction is a critical research topic in the field of image classification and pattern recognition. The scale of the original data directly obtained in the real application scenarios is large in the era of big data. The high dimension and high redundancy make it hard to store and process data and also put forward higher requirements for the hardware platform of data storage and data processing. Data dimension reduction technology reduce the number of dimensions of original high-dimensional data, which aims to ensure the low-dimensional data can retain most of the information while it reduces the dimensions as much as possible. This can improve data storage and data processing efficiency and reduce requirements for hardware as well as subsequent data processing algorithms. Because data dimension reduction technology can reduce data dimension and storage space, save model training time, and enhance the accuracy of subsequent algorithms, it has been widely applied in the real application scenarios such as the face recognition, hyperspectral image classification and Chinese herbal medicine classification to perform early data processing.

Existing data dimension reduction methods can be divided into feature selection and feature extraction methods. Feature selection methods directly select critical features from the original high-dimensional data, while feature extraction methods obtain new features by projecting original features into a new space. The former helps to remain the physical meanings of data, while the new features of the latter are difficulty to explain. However, the performance of feature extraction is more satisfying than feature selection. Linear Discriminant Analysis (LDA) is a common method for feature extraction, which can well remain the discriminant information of original data and is usually used to perform the preprocessing of data classification. However, traditional LDA enforces the low dimension cannot be higher than or equal to the total class number of data, and it is prone to be unsolvable due to the non-singularity of the matrix during the solving process.

The original data features of image classification are often high-dimensional, but too high dimension may lead to lower classification accuracy. Additionally, there is redundant information in the original data. Therefore, directly using the original data for classification will cause low speed of processing data, low classification accuracy, etc. With the development of hyperspectral technology, hyperspectral imaging has been widely applied in land-cover classification and it is of great practical significance to perform dimension reduction on the high-dimensional hyperspectral data to reduce the cost of data storage and extract critical features and class information of the original data.

Yang Mingli, Fan Yugang, Li Baoyun (Research on dimensionality reduction and classification of hyperspectral images based on LDA and ELM, Journal of Electronic Measurement and Instrumentation, 2020, 34(05):190-196.) process hyperspectral image data by LDA for dimension reduction, and then Extreme Learning Machine (ELM) is adopted to perform classification. LDA projects original data into a low-dimensional space form the high-dimension space by learning a projection matrix and to maximize the within-class similarity and minimize the between-class similarity in the subspace. Hence LDA can well realize dimension reduction and strengthen class features, which further leads to improve the efficiency and accuracy of final hyperspectral image land-cover classification.

However, traditional methods based on LDA have a trend to select features with small variances which are difficult to be effectively classified. And these methods need to calculate inverse matrix of within-class covariance matrix but this matrix is often singular, which cause that LDA fails to preform dimension reduction for hyperspectral images. Generally, a preprocessing is employed to ensure the non-singularity of within-class covariance matrix for traditional LDA methods and finally achieve dimension reduction. However, this strategy leads to complex data processing flow and interaction between the preprocessing and the dimension reduction.

SUMMARY OF THE INVENTION

Problems to be Solved

For the proposed problem that the traditional LDA methods tend to select features with small variances and low discriminant ability as well as the solving of the optimization problem relies on reversible within-class covariance matrix, the present invention proposes a data dimension reduction method based on maximizing the ratio sum for the linear discriminant analysis. For the problem of low efficiency and low accuracy for the image classification caused by the imperfections of dimension reduction methods, this invention proposes a method of land-cover classification of hyperspectral images.

Technical Solution

A data dimension reduction method based on maximizing the ratio sum for linear discriminant analysis, characterized in that steps are as follows:

step 1: the data matrix, the label vector and the label matrix of the data being hyperspectral images, Chinese herbal medicine images or face images, are constructed;

step 2: a within-class covariance matrix and a between-class covariance matrix are calculated;

step 3: an optimization problem based on the maximum ratio sum for the linear discriminant analysis is constructed, the objective function of the optimization problem is designed as $$F(W) = \sum_{k=1}^{m} \frac{w_k^T S_b w_k}{w_k^T S_w w_k}, k = 1, 2, \ldots, m,$$

where an optimization variable is the projection matrix $W=[w_1, w_2, \ldots, w_m] \in \mathbb{R}^{d \times m}$ satisfying $W^T W = I$; the equivalent objective function of F(W) is constructed as $$J(W, \lambda) = \sum_{k=1}^{m} \left( \lambda_k^2 w_k^T (\sigma I_d - S_w) w_k + 2\lambda_k \sqrt{w_k^T S_b w_k} \right), k = 1, 2, \ldots, m,$$

where the optimization variables are the projection matrix $W=[w_1, w_2, \ldots, w_m] \in \mathbb{R}^{d \times m}$ satisfying $W^T W = I$ and the vector $\lambda=[\lambda_1, \lambda_2, \ldots, \lambda_m] \in \mathbb{R}^{L \times m}$; m is the feature dimension of the final projected subspace and $\sigma$ is an adaptive parameter; $S_w$ is the within-class covariance matrix and $S_b$ is the between-class covariance matrix;

step 4: the optimal projection matrix that can maximize the objective function is obtained.

Further, the technical solution of the invention: step 1 is specifically as follows: a set of n samples with the feature dimension d is obtained as $x_i=[x_{i1}, x_{i2}, \ldots, x_{id}]^T$ (i=1, 2, \ldots, n) \in \mathbb{R}^{d \times 1}$, each element of $x_i$ denotes the feature of the corresponding sample. The label vector of n samples is $y=[y_1, y_2, \ldots, y_n]^T \in \mathbb{R}^{n \times 1}$ where $y_i=1,2,\ldots,c$ denotes the class of the i-th sample and c is the total class number of the sample; the training sample matrix $X=[x_1, x_2, \ldots, x_m] \in \mathbb{R}^{d \times m}$ with n samples is constructed and the label vector is used to construct the label matrix $G \in \mathbb{R}^{n \times c}$ with each element being defined as:

$$g_{ij} = \begin{cases} 1, & y_i = j \\ 0, & \text{otherwise} \end{cases}$$

where i=1,2, \ldots, n, j=1,2, \ldots, c.

Still further, the technical solution of the invention: step 2 is specifically as follows:

$$S_w = X((I_n - G(G^T G)^{-1} G^T)/n) X^T$$

$$S_b = X((G(G^T G)^{-1} G_c^T - 11^T/n)/n) X^T$$

where X and G are the sample matrix and label matrix obtained in step 1, respectively. $I_n \in \mathbb{R}^{n \times n}$ inn is a n-order identity matrix, and $1=[1,1, \ldots, 1]^T \in \mathbb{R}^{n \times 1}$ is a n-dimensional column vector with every element being "1".

Still further, the technical solution of the invention: in step 4, the projection matrix $W=[w_1, w_2, \ldots, w_m] \in \mathbb{R}^{d \times m}$ is obtained by using an alternative and iterative optimization algorithm.

A method of hyperspectral image land-cover classification which employs the above dimension reduction method: the samples of step 1 are hyperspectral images and the value of the feature takes the grayscale value of a single band image after graying; n is the total number of pixels in the single band image and c is the total number of pixel ground object classes; steps 1-4 are performed in sequence to obtain the projection matrix; the data matrix composed of the grayscales of the corresponding pixels in all bands in the hyperspectral image with unknown labels is projected by the projection matrix and the projected sample matrix Z is obtained; each column of Z is taken as all the new feature sequences of the pixels corresponding to the ground objects with unknown labels, the K-nn classifier (k-nearest neighbor classifier) trained with training samples is applied to classify the projected new pixel samples, and the class labels of pixels corresponding to the ground objects with unknown labels are finally obtained.

Preferably, the k of the K-nn classifier is 3.

BENEFITS

This invention proposes a data dimension reduction method based on maximizing the ratio sum for the linear discriminant analysis, constructs the objective function based on the linear discriminant analysis by maximizing the ratio sum, avoids the problem that the traditional linear discriminant analysis tends to select features with small variances and weak discriminating ability, and can select features which are more conducive to classification.

The alternating direction method of multipliers is employed to solve the optimization problem of the linear discriminant analysis by maximizing the ratio sum. This algorithm does not involve solving the inverse matrix of the within-class covariance matrix and does not need data preprocessing, which enhances the adaptability of the data dimension reduction method to raw data features.

This invention proposes a method of hyperspectral image land-cover classification by maximizing the sum of the ratios of the between-class distance to the within-class distance of all the feature dimension in the subspace, which avoids select features with small variances and helps to improve the classification accuracy. The alternating direction method of multipliers is applied to solve the problem of maximizing the ratio sum. Since the algorithm does not involve matrix inversion, it avoids the insolvable problem of LDA based methods caused by the non-singular within-class covariance matrix. Therefore, this invention can achieve the data dimension reduction better and extract features which are more discriminable; thereby reducing difficulty of storing hyperspectral data, increasing speed of data processing, extracting features which are more efficient; which can finally improve the classification accuracy of ground object classification.

DETAILED DESCRIPTION OF THE PREFERRED EMBODIMENTS

This invention will now be further described with reference to examples and the drawings.

Figure 1:
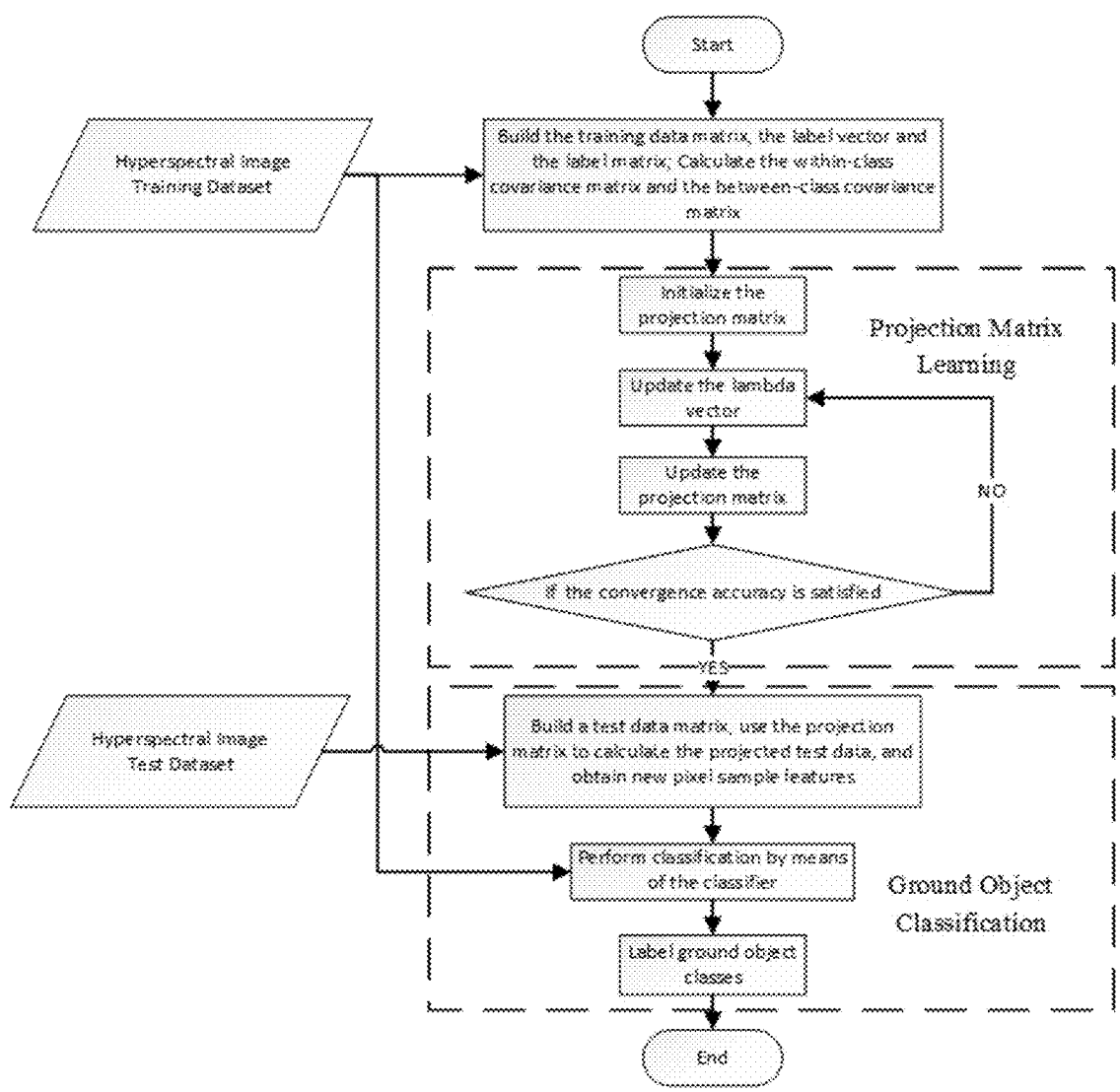
FIG. 1 is the flowchart of the dimension reduction method of the present invention.
Figure 2:
FIG. 2 is the grayscale image of an actual scene.
Figure 3:
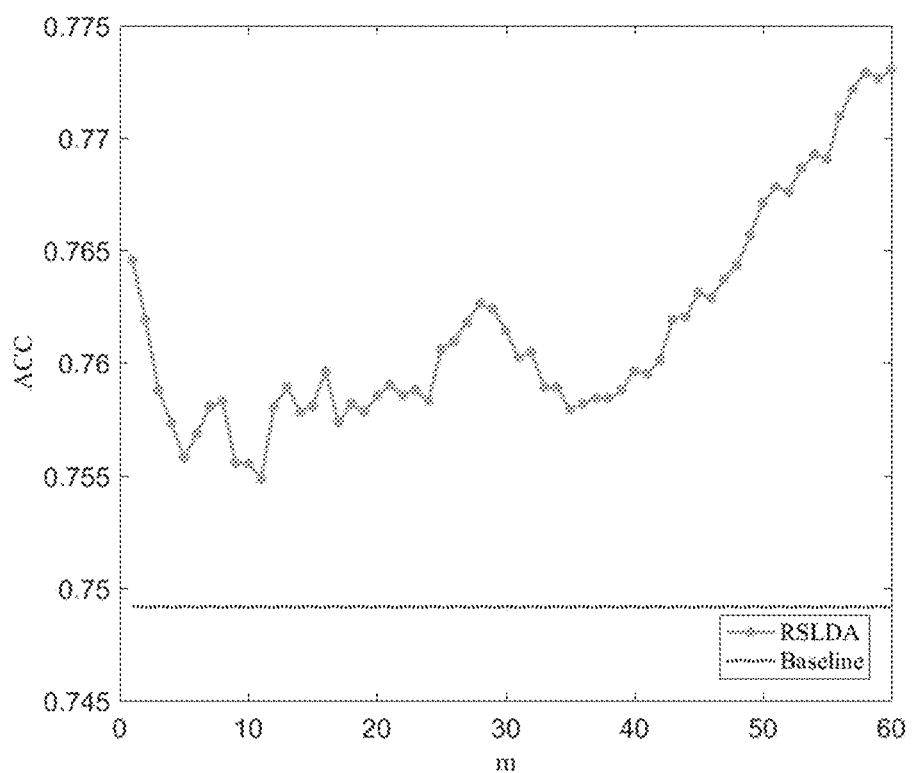
FIG. 3 is the plot of ground object classification accuracy results.

The flow of the data dimension reduction method of maximizing the ratio sum for the linear discriminant analysis of this invention is shown in FIG. 1, and the detailed description of this invention is described below in connection with the example of ground object classification on hyperspectral images of real scenes, but the technical content of the present invention is not limited to the described scope.

The present invention proposes a method of hyperspectral image land-cover classification based on maximizing the ratio sum for the linear discriminant analysis, including steps as follows:

Step 1: A set of hyperspectral images with the feature dimension d (i.e. the total number of hyperspectral bands is d) is obtained. The feature dimension d in the real feature dataset is set as 103. The value of the feature corresponds to the gray value of the corresponding pixel for each band. The total number of pixels in a single wave band is n. Performing equidistant sampling on a real data set, the number of training samples is 2074, and the labels of ground object classification in all the pixels are 10 in total. Furthermore, we can construct the data matrix, the label vector, the label matrix, the within-class covariance matrix and the between-class covariance matrix, which can be mainly divided into the following two processes:

(1) A set of hyperspectral images with feature dimensions d (the feature value takes the gray value of a single band after graying) is obtained. The total number of pixels in a single band is n, and all the features of the i-th pixel are represented as $x_i=[x_{i1}, x_{i2}, \ldots, x_{id}]^T$ (i=1, 2, $\ldots$, n)$\in^{d\times 1}$, in which the j-th element of $x_i$ represents the value of the j-th feature of the i-th pixel. $y=[y_1, y_2, \ldots, y_n]^T \in^{-n\times 1}$ represents the label vector for every one of training datasets, in which $y_i=1,2,\ldots,c$ and c is the total number of ground object categories of pixel figures.

(2) Based on the label vector $y=[y_1, y_2, \ldots, y_n]^T \in^{-n\times 1}$, we can construct the label matrix $G\in^{-n\times c}$, in which the value of each element is defined as:

$$g_{ij} = \begin{cases} 1, & y_i = j \\ 0, & \text{otherwise} \end{cases}$$

where i=1,2, $\ldots$, n, j=1,2, $\ldots$, c, (i.e. each pixel has the value of 1 in its corresponding class and other positions are zero). Calculating the within-class covariance matrix $S_w$ and the between-class covariance matrix $S_b$:

$$S_w = X((I_n - G(G^T G)^{-1} G^T)/n) X^T$$

$$S_b = X((G(G^T G)^{-1} G_c^T - 11^T/n)/n) X^T$$

where X and G are the sample matrix and the label matrix obtained according to step 1, respectively. $I_n \in^{-n\times n}$ inn is a n-order identity matrix, and $1=[1,1,\ldots,1]^T \in^{-n\times 1}$ is an n-dimensional all-one column vector.

Step 2: An optimization problem is constructed and we can solve an optimal projection matrix, the process of which is mainly divided into the following two processes:

(1) The optimization problem can be established and the optimal projection matrix can be obtained. It is necessary to solve the optimization problem by maximizing the sum of the ratios of the between-class distances to the within-class distances of the samples in each feature dimension of the subspace:

$$\max_{W^T W = I} \sum_{k=1}^{m} \frac{w_k^T S_b w_k}{w_k^T S_w w_k}$$

The equivalent problem is established as:

$$\max_{W^T W = I} \sum_{k=1}^{m} \left( \lambda_k^2 w_k^T (\sigma I_d - S_w) w_k + 2\lambda_k \sqrt{w_k^T S_b w_k} \right)$$

where m is the feature dimension of the final subspace and $\sigma$ is an adaptive parameter. To guarantee the convergence of algorithm, the value of $\sigma$ should be sufficiently large and we take it as $Tr(S_w) \times 10^{10}$.

(2) The alternating iterative optimization algorithm is adopted to solve the optimization problem according to the following steps to obtain the projection matrix $W=[w_1, w_2, \ldots, w_m] \in^{-d\times m}$.

① The projection matrix is initialized as $W_0=[w_{0,1}, w_{0,2}, \ldots, w_{0,m}]$ which satisfies $W_0^T W_0 = I$, t=0;

②

$$\lambda_{t_1,k} = \frac{\sqrt{w_{t_1,k}^T S_b w_{t_1,k}}}{w_{t_1,k}^T S_w w_{t_1,k}}$$

is calculated, and k=1,2, $\ldots$, m;

③ W needs to be updated as follows $$W_{t_1+1} = [w_{t_1+1,1}, w_{t_1+1,2}, \ldots, w_{t_1+1,m}] \in^{-d\times m}:$$

i. we initialize $t_2=0$ and $W_{t_1+1}(0)$ as:

$$W_{t_1+1}(0) = [w_{t_1,1}, w_{t_1,2}(0), \ldots, w_{t_1,m}(0)] \in^{-d\times m}:$$

ii. Due to $A_{t_2,k} \in^{d\times d}$, $B_{t_2,k} \in^{d\times d}$ where k=1,2, $\ldots$, m, the follow values need to be calculated:

$$A_{t_2+1,k} + \lambda_{t_1 k}^2 (\sigma I_d - S_w)$$

$$B_{t_2,k} = \frac{\lambda_{t_1,k} S_b}{\sqrt{w_{t_1+1,k}(t_2)^T S_b w_{t_1+1,k}(t_2)}}$$

iii. $c_{t_2,k} = 2(A_{t_2,k} + B_{t_2,k})^T w_{t_1,k}(t_2) \in^{d\times 1}$, k=1, 2, $\ldots$, m, and $C_{t_2} = [c_{t_2,1}, c_{t_2,2}, \ldots, c_{t_2,m}] \in^{-d\times m}$ are calculated;

iv. The complete Singular Value Decomposition (SVD) on $C_{t_2}$ is performed: $C_{t_2} = U_{t_2} \Sigma_{t_2} V_{t_2}^T$, where $U \in^{-d\times d}$, $V \in^{-m\times m}$ are the unitary matrix, $\Sigma \in^{-d\times m}$ is the diagonal matrix, of which the diagonal singular values are arranged from large to small;

v. $W_{t_1+1}(t_2+1) = [w_{t_1+1,1}(t_2+1), w_{t_1+1,2}(t_2+1), \ldots, w_{t_1+1,m}(t_2+1)] = U_{t_2}[I_m; 0_{(d-m)\times m}] V_{t_2}^T$ is calculated;

vi. Whether the convergence condition $\|W_{t_1+1}(t_2+1) - W_{t_1+1}(t_2)\|_2 < \varepsilon_2$ is satisfied needs to be judged. If the convergence condition is not satisfied, let $t_2=t_2+1$, and return to step ii to continue the calculation; if the convergence condition is satisfied, let $W_{t_1+1} = W_{t_1+1}(t_2+1)$, stop the calculation and proceed to step ④. $\varepsilon_2$ is the convergence accuracy, which can be artificially given according to the application, and is set to $10^{-6}$ here.

④ Whether the value of objective function $$F_{t_1} = \sum_{k=1}^{m} \frac{w_{t_1,k}^T S_b w_{t_1,k}}{w_{t_1,k}^T S_w w_{t_1,k}}$$

satisfies the convergence condition $\|F_{t_1+1} - F_{t_1}\|_2 < \varepsilon_1$ needs to be judged. If the convergence condition is not satisfied, let $t_1=t_1+1$, and return to step ②; if the convergence condition is satisfied, stop the calculation and obtain the projection matrix to be solved $W=W_{t_1+1}$. Here the projection matrix is obtained by learning. $\varepsilon_i$ is the convergence accuracy, and it can be artificially given according to the application. We set it as $10^{-6}$ here.

Step 3: A set of hyperspectral images of a certain area are taken by using the same hyperspectral camera to perform ground object classification. The feature dimension of the hyperspectral images is still d, which is set as 103 here. The feature value takes the gray value of a single band after graying. The total number of pixels in a single band is n' and the total number of test samples is 8296. The original features of these samples are obtained in exactly the same way as the training dataset.

All features of the i-th pixel are represented as $x_1' [x_{i1}', x_{i2}', \ldots, x_{id}']^T$ (i=, 2, ..., n')$\in \mathbb{R}^{d\times 1}$ and the j-th element of $x_i'$ corresponds to the value of the j-th feature. Then the hyperspectral image pixels with unknown labels are classified, which is mainly divided into the following two processes:

(1) The projection matrix obtained in step 2 is used to project the data matrix composed of the grayscales of the corresponding pixels in all bands in the obtained hyperspectral image with the unknown label, and obtain the projected sample matrix $Z=W^T X'=[z_1, z_2, \ldots, z_n] \in \mathbb{R}^{m\times n}$, where each column represents the value of a new set of features for a hyperspectral image pixel with the unknown label. m is the total number of new features (i.e. the number of dimensions of the subspace), $z_i=[z_{i1}, z_{i2}, \ldots, z_{im}]^T$ (i=1,2, ..., n)$\in \mathbb{R}^{m\times 1}$;

(2) Each column of z is taken as all feature sequences of pixels corresponding to ground objects with the new unknown labels, and then the projected new pixel samples are classified with the K-nn classifier (k=3) which has been trained with the training samples. Finally, the category labels of the pixels corresponding to ground objects with the unknown labels are obtained.

It can be seen from the classification results that Baseline is the classification result of the original training data by directly using the trained K-nn classifier, and RSLDA is the classification result of the present invention by using the trained K-nn classifier after dimensionality reduction of the original data. When the dimension of the subspace (the number of new features) is specified from 1 to 60, the data dimension reduction method of the present invention can obtain higher classification accuracy by combining the classifier for classification. Furthermore, during the calculation process, the data dimension reduction algorithm of the present invention will not be unsolvable caused by the singularity of the within-class covariance matrix.

All above are only specific embodiments of this invention, but the protection scope of the present invention is not limited to this. Any person skilled in the art can easily think of various equivalent modifications or substitutions within the technical scope disclosed by the present invention. All these modifications or substitutions should be included within the protection scope of the present invention.

What is claimed is:

1. A method of hyperspectral image land-cover classification based on maximizing a ratio sum for linear discriminant analysis, comprising:

step 1: obtaining a set of n samples represented by $x_i=[x_{i1}, x_{i2}, \ldots, x_{id}](i=1,2, \ldots, n)^T \in \mathbb{R}^{d\times 1}$, wherein d denotes a feature dimension, each element in $x_i$ denotes a feature value of a corresponding sample;

defining a label vector of n samples as $y=[y_1, y_2, \ldots, y_n]^T \in \mathbb{R}^{n\times 1}$, where $y_i \in \{1,2, \ldots, c\}$ indicates a class label of the i-th sample and c is a total class number of samples; and constructing a training sample matrix $X=[x_1, x_2, \ldots, x_n] \in \mathbb{R}^{d\times n}$ containing the set of n samples and using the label vector to form a label matrix $G \in \mathbb{R}^{n\times c}$ with each element being defined as:

$$g_{ij} = \begin{cases} 1, & y_i = j \\ 0, & \text{otherwise} \end{cases}$$

where i=1,2, ..., n, j=1,2, ..., c;

wherein the set of n samples are hyperspectral images and the feature values are grayscale values of a single band image after graying; n is a total number of pixels in the single band image; c is a total number of ground object classes;

step 2: calculating a within-class covariance matrix $S_w$ and a between-class covariance matrix $S_b$, wherein:

$S_w = X((I_n - G(G^T G)^{-1} G^T)/n)X^T$ $S_b = X((G(G^T G)^{-1} G_c^T - 11^T/n)/n)X^T$ $I_n \in \mathbb{R}^{n\times n}$ is an n-order identity matrix, and $1=[1,1, \ldots, 1]^T \in \mathbb{R}^{n\times 1}$ is an n-dimensional column vector with every element being "1";

step 3: constructing an objective function of an optimization problem based on maximizing a ratio sum for linear discriminant analysis as $$F(W) = \sum_{k=1}^{m} \frac{w_k^T S_b w_k}{w_k^T S_w w_k},$$

where m is a feature dimension of a final projected subspace, and $W=[w_1, w_2, \ldots, w_m] \in \mathbb{R}^{d\times m}$ in F(W) is an optimization variable represented by a projection matrix satisfying $W^T W = I$; constructing an equivalent objective function of F(W) as $$J(W, \lambda) = \sum_{k=1}^{m} \left( \lambda_k^2 w_k^T (\sigma I_d - S_w) w_k + 2\lambda_k \sqrt{w_k^T S_b w_k} \right),$$

where $\lambda = [\lambda_1, \lambda_2, \ldots, \lambda_m] \in \mathbb{R}^{1\times m}$ is a vector, and σ is an adaptive parameter;

step 4: obtaining an optimal solution of the projection matrix W that can maximize the objective function in step 3 by using an alternating direction method of multipliers;

sequentially performing steps 1-4 to obtain the projection matrix;

using the projection matrix to project the training sample matrix comprising of the grayscales of the corresponding pixels across all bands of the hyperspectral images with unknown labels, and to obtain a new projected pixel sample matrix Z, where each column of Z is a new feature vector representing an unlabeled pixel of ground objects; and applying a k-nearest neighbor classifier trained on labeled training samples to classify the new projected pixel samples in Z and to output final class labels for pixels corresponding to ground objects with unknown labels.

2. The method of claim 1, wherein in the k-nearest neighbor classifier k=3.

* * * * *